United States Patent [19]

Nair et al.

[11] Patent Number: 4,833,060
[45] Date of Patent: May 23, 1989

[54] POLYMERIC POWDERS HAVING A PREDETERMINED AND CONTROLLED SIZE AND SIZE DISTRIBUTION

[75] Inventors: Mridula Nair, Penfield; Zona R. Pierce, Rochester; Chandra Sreekumar, Penfield, all of N.Y.

[73] Assignee: Eastman Kodak Company, Rochester, N.Y.

[21] Appl. No.: 171,065

[22] Filed: Mar. 21, 1988

[51] Int. Cl.$^4$ .................................................. G03G 9/08
[52] U.S. Cl. ..................................... 430/137; 523/333; 523/339; 430/110
[58] Field of Search .................. 430/137; 523/333, 339

[56] References Cited

U.S. PATENT DOCUMENTS

| | | |
|---|---|---|
| 2,932,629 | 4/1960 | Wiley . |
| 2,934,530 | 4/1960 | Ballast et al. . |
| 3,586,654 | 6/1971 | Lerman et al. . |
| 3,615,972 | 10/1971 | Morehouse et al. ................... 156/79 |
| 3,847,886 | 11/1974 | Blunt . |
| 4,254,207 | 3/1981 | Landoll et al. ..................... 430/137 |
| 4,314,932 | 2/1982 | Wakimoto et al. . |
| 4,702,989 | 11/1987 | Sugiyama et al. .................. 430/137 |

FOREIGN PATENT DOCUMENTS

| | | | |
|---|---|---|---|
| 54-2742 | 1/1979 | Japan ................................. 430/137 |
| 54-2744 | 1/1979 | Japan ................................. 430/137 |
| 61-91666 | 5/1986 | Japan . |

*Primary Examiner*—Paul R. Michl
*Assistant Examiner*—Jeffrey A. Lindeman
*Attorney, Agent, or Firm*—Robert A. Gerlach

[57] ABSTRACT

Toner and/or carrier particles are prepared by dissolving a polymer in a solvent which is immiscible with water forming a suspension of small droplets of the polymer and solvent in water containing a promoter and silica particles, removing the solvent from the droplets and separating the solidified particles from the water.

14 Claims, 1 Drawing Sheet

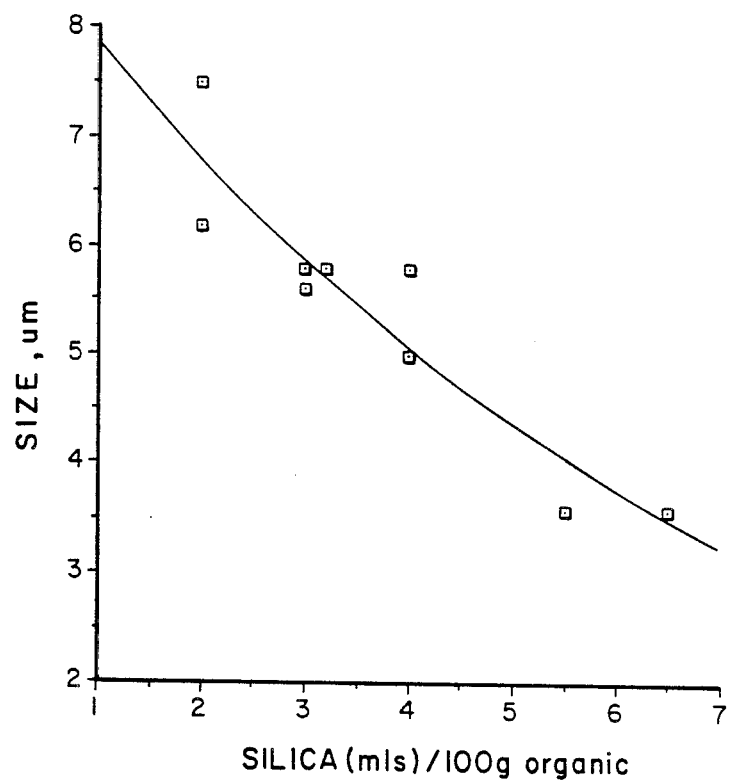

4,833,060

POLYMERIC POWDERS HAVING A PREDETERMINED AND CONTROLLED SIZE AND SIZE DISTRIBUTION

BACKGROUND OF THE INVENTION

This invention relates to polymeric powders suitable as electrostatographic toner and carrier particles and to a method of preparing the same. More particularly, this invention relates to a method of preparing toner and/or carrier particles having controlled and predetermined size and size distribution.

Commonly, polymeric particles including toner and carrier are prepared by numerous methods, probably the most primitive of which is by grinding bulk polymer materials to a suitable particle size and/or particle size distribution. The disadvantages of this process are widely known. First, the particles are of a totally irregular shape after grinding and may not be suitable for the intended purpose and secondly, because of the toughness of some types of polymeric materials grinding cannot be accomplished.

U.S. Pat. No. 3,586,654 discloses numerous techniques for preparing polymer powders in addition to the grinding technique including a solution process, wherein a polymer is dissolved in a solvent and then precipitated from the solvent by the addition of a non-solvent that is miscible with the solvent; the dispersion process wherein molten polymer is introduced into a water solution containing dispersing agents such as soaps, and several similar techniques including the claimed invention thereof which is a process for preparing powders by dispersing polymer particles in a liquid that is a non-solvent for the polymer, heating the dispersion together with agitation above the melting temperature of the polymer and then cooling to recover the solidified polymer particles. While these techniques are useful under certain specified conditions they all suffer from disadvantages either in processing conditions, such as, the need for pressure vessels should the melting temperature of the polymer particles be greater than the boiling point of water or other non-solvent used; or in the condition of the particles at the end of the technique, such as coated with the surfactant and the like. Such conditions render particles impractical for use in many applications, particularly in their use in electrostatography wherein the particles are triboelectrically charged in order to achieve the intended result.

U.S. Pat. No. 3,847,886 teaches a method of making small particles of solid polymer by dissolving a polymer in a water immiscible polar solvent, emulsifying the solution in water, generally with the use of an emulsifying agent, adding a water immiscible organic liquid that is miscible with the solvent but a non-solvent for the polymer and recovering the polymer particles.

U.S. Pat. No. 4,254,207 provides a method of making small spherical particles of crystalline condensation-type polymers by agitating a fluid mixture of the crystalline polymer in an aprotic liquid which is a non-solvent for the polymer and containing an acid-modified polymer of propylene at a temperature above the crystalline melting point of the polymer, cooling and recovering the solid particles from the aprotic liquid. These last two methods suffer the disadvantages that they are limited with regard to the type of polymer that can be employed to make the powder particles or the condition of the powder that results because of the various ingredients that are employed in the process.

Japanese Kokai NoSho 61-91666 discloses a method of making toner by dispersing a binder resin in an halogenated hydrocarbon solvent, dispersing the mixed solution in an aqueous medium and after removing the solvent, dehydrating and drying the resulting particles Polymeric powders can also be prepared by emulsion and suspension polymerization techniques. In suspension polymerization, monomer droplets are dispersed in a water solution and polymerization takes place within each droplet. The solidified polymer particles are separated from the remainder of the system. Patents utilizing these techniques referred to as "limited coalescence" include U.S. Pat. Nos. 2,934,530, 3,615,972, 2,932,629 and 4,314,932. These methods, however, are limited with respect to the type of polymer that can be prepared.

SUMMARY OF THE INVENTION

The invention provides a method of making toner and/or carrier particles regardless of the chemical nature of the polymer employed, for a predetermined size and size distribution by forming a solution of a polymer in a solvent that is immiscible with water, dispersing the polymer-solvent solution in water containing a promoter and silica particles having an average particle size of from 0.001 to 1 μm and being present in a concentration of from 0.5 to 21 milliliters of a 50 percent by weight dispersion in water based on 100 grams of the polymer and solvent present, preferably in an amount of from 0.5 to 10 milliliters of a 50 percent by weight dispersion/100 grams of solvent and polymer, the silica being present as a water-insoluble solid particulate suspension stabilizer, subjecting the dispersion to a high sheer action thereby reducing the particle size of the droplets in water, removing the water immiscible solvent and solid silica particulate suspension stabilizer from the polymer particles thus formed and recovering the polymeric powder from the water phase.

Thus, the invention contemplates the preparation of toner or carrier from any type of polymer that is soluble in a solvent that is immiscible with water. By this process the size and size distribution of the resulting particles can be predetermined and controlled by the relative quantities of the particular polymer employed, the solvent, the quantity and size of the water-insoluble solid silica particulate suspension stabilizer, and the size to which te solvent-polymer droplets are reduced by the agitation employed. Thus, for an organic solution of a polymer in a solvent where A is the weight fraction of the polymer in the solvent, which is reduced to discontinuous droplets by high shear in a continuous aqueous phase to an initial particle size of radius $R_1$, the approximate radius of the final particle $R_2$ is calculated by the formula $R_2 = 3\, A^{1/3} R_1$. the initial particle size can be predetermined by the concentration of silica stabilizer employed in accordance with the FIGURE. While it is contemplated that the method of this invention applies equally to either toner or carrier particles, for the purpose simplicity in describing this invention, only toner particles will be mentioned throughout this specification.

BRIEF DESCRIPTION OF DRAWING

The sole FIGURE is a graph showing the relationship of the concentration of the silica particles in milliliters/100 grams of organic matter in the droplets as it relates to the size of the initial polymer particles in μm including solvent formed by the process of this invention when the particle size of the silica particles is from 13-24 nanometers. Throughout this specification and claims where concentration of silica particles in milliliters is spoken of, the volume in milliliters is meant a 50 percent by weight dispersion of silica particles in water.

DETAILED DESCRIPTION OF THE INVENTION

In accordance with this invention, the polymer from which the polymeric powders are to be made is dissolved in a quantity of a solvent, the solvent being immisible with water. The quantity of solvent is important in that the size of the particles thus prepared under given agitation conditions influences the size of the powder particles that result. It is generally the case that higher concentrations of polymer in the solvent produce larger particle size powder particles having a lower degree of shrinkage than that produced by lower concentrations of polymer in the same solvent. The concentration of the polymer in the solvent should be from about 1 to about 80 and preferably from about 2 to about 60% by weight. When preparing electrographic toner particles the concentration of polymer in solvent is generally maintained at from 10 to 35% by weight for a polyester resin having a number average molecular weight of 10,000 and a weight average molecular weight of 200,000.

The solution of polymer in the solvent is next introduced into an aqueous solution containing a particulate dispersing agent and a promoter which drives the particulate dispersing agent to the interface between the water layer and the polymer solvent droplets formed by the agitation conducted on the system. To achieve this effect, it is generally desired to control the pH of the system at a value of from about 2 to about 7, preferably from about 3 to 6 and most preferably 4. The promoter should be present in an amount of 1 to about 10 percent and preferably from about 2 to 7 percent based on the weight of the polymer and solvent. The size of the droplets formed, depends on the shearing action on the system plus the amount of the particulate dispersing agent employed. While any high shear type agitation device is applicable to the process of this invention, it is preferred that the polymer in solution be introduced into the aqueous phase in a microfluidizer such as Model No. 110T produced by Microfluidics Manufacturing. In this device the droplets of polymer in solvent are dispersed and reduced in size in the water phase in a high shear agitation zone and upon exiting this zone the particle size of the polymer in solution results as a discontinuous phase in the continuous aqueous phase. Each of the polymer-in-solution droplets are surrounded by the solid dispersing agent, which within predetermined limits in accordance with the FIGURE, limits and controls both the size and size distribution of the solvent-polymer droplets.

As indicated, after exiting the microfluidizer, the particle size of the polymer/solvent droplets are established. The solvent is next removed from the droplets by any suitable technique, such as, for example, heating the entire system to vaporize the solvent and thus remove it from the discontinuous phase droplets remaining in the aqueous solution surrounded by the $SiO_2$ particles.

Next, should it be desired, the $SiO_2$ dispersing agent may be removed from the surface of the polymer particles by any suitable technique such as dissolving in HF or other fluoride ion or by adding an alkaline agent such as potassium hydroxide to the aqueous phase containing the polymer particles to thereby raise the pH to at least about 12 while stirring. This method is preferred. Subsequently to raising the pH and dissolving the silica, the polymer particles can be recovered by filtration and finally washed with water or other agents to remove any desired impurities from the surface thereof.

As indicated above, the invention is applicable to the preparation of polymeric toner particles from any type of polymer that is capable of being dissolved in a solvent that is immiscible with water and includes such as, for example, olefin homopolymers and copolymers, such as polyethylene, polypropylene, polyisobutylene, and polyisopentylene; polyfluoroolefins, such as polytetrafluoroethylene and polytrifluorochloroethylene; polyamides, such as polyhexamethylene adipamide, polyhexamethylene sebacamide, and polycaprolactam; acrylic resins, such as polymethylmethacrylate, polymethylacrylate, polyethylmethacrylate, and styrene-methylmethacrylate; ethylene-methyl acrylate copolymers, ethylene-ethyl acrylate copolymers, ethylene-ethyl methacrylate copolymers, polystyrene and copolymers of styrene thereof with unsaturataed monomers mentioned above, cellulose derivatives, such as cellulose acetate, cellulose acetate butyrate, cellulose propionate, cellulose acetate propionate, and ethyl cellulose; polyesters, such as polycarbonates; polyvinyl resins, such as polyvinyl chloride, copolymers of vinyl chloride and vinyl acetate, and polyvinyl butyral, polyvinyl acetal, ethylene-vinyl acetate copolymers, ethylene-vinyl alcohol copolymers, and ethylene-allyl copolymers, such as ethylene-allyl alcohol copolymers, ethylene-allyl acetate copolymers, ethylene-allyl acetone copolymers, ethylene-allyl benzene copolymers ethylene-allyl ether copolymers, and ethylene-acrylic copolymers; and polyoxymethylene, polycondensation polymers, such as, polyesters, polyurethanes, polyamides, polycarbonates and the like.

Any suitable solvent that will dissolve the polymer and which is also immiscible with water may be used in the practice of this invention such as for example, chloromethane, dichloromethane, ethyl acetate, vinyl chloride, MEK, trichloromethane, carbon tetrachloride, ethylene chloride, trichloroethane, toluene, xylene, cyclohexanone, 2-nitropropane and the like. A particularly useful solvent in the practice of this invention is dichloromethane for the reason that it is both a good solvent for many polymers while at the same time it is immiscible with water. Further, its volatility is such that it is readily removed from the discontinuous phase droplets by evaporation.

The $SiO_2$ dispersing agent generally should have dimensions such that they are from about 0.001 μm to about 1 μm preferably from about 5 to 35 nanometers and most preferably from about 10-25 nanometers. The size and concentration of these particles controls and predetermines the size of the final toner particle. A particularly useful silica dispersing agent is sold by DuPont under the name Ludox TM.

In this regard, reference is made to the FIGURE wherein for silica particles having a size of from 13-24 nanometers, the size of the droplets of polymer and solvent is shown to decrease as the concentration of silica particles increases. Thus, from this graph and the concentration of polymer in solvent, the size of the finished toner can be reasonably predicted.

Any suitable promoter that is water soluble and affects the hydrophilic/hydrophobic balance of the solid dispersing agent in the aqueous solution may be employed in order to drive the solid dispersing agent to the polymer/solvent droplet-water interface, such as, for example, sulfonated polystyrenes, alginates, carboxymethyl cellulose, tetramethyl ammonium hydroxide or chloride, diethylaminoethylmethacrylate, water-soluble complex resinous amine condensation products such as the water soluble condensation products of diethanol amine and adipic acid, a particularly suitable one of this type is poly(adipic acid-co-methylaminoethanol), water-soluble condensation products of ethylene oxide, urea and formaldehyde and polyethyleneimine. Also effective as promoters are gelatin, glue, casein, albumin, gluten and the like. Nonionic materials such as methoxy cellulose may be used. Generally, the promoter is used in amounts of from about at least 0.2 and preferably 0.25 to about 0.6 parts per 100 parts of aqueous solution.

In accordance with this invention, the quantities of the various ingredients and their relationship to each other can vary over wide ranges, however, it has generally been found that the ratio of the polymer to the solvent should vary in an amount of from about 1 to about 80 percent by weight of combined weight of the polymer and the solvent and that the combined weight of the polymer in the solvent should vary with respect to the quantity of water employed in an amount of from about 25 to about 50 percent in weight. Also the size and quantity of the solid dispersing agent depends upon the size of the particles of the solid dispersing agent and also upon the size of the toner particles desired. Thus, as the size of the polymer/solvent droplets are made smaller by the high shear agitation, the quantity of the $SiO_2$ dispersing agent varies in order to prevent the uncontrolled coalescence of the particles and in order to achieve uniform size and size distribution in the particles that result.

Particles having an average size of from 0.05 $\mu$m to 100 $\mu$m and preferably from 0.1 $\mu$m to 60 $\mu$m may be prepared in accordance with this invention.

Various addenda generally present in electrostatographic toner may be added to the polymer prior to the dissolution in the solvent or in the dissolution step itself, such as, colorant selected from a wide variety of dyes and pigments such as disclosed for example, in U.S. Pat. No. Re. 31,072 may be used. A particularly useful colorant for toners to be used in black-and-white electrophotographic copying machines is carbon black. Colorants in the amount of from about 1 to about 30 percent by weight based on the weight of the toner may be used. Preferably from about 1 to 8 percent by weight of colorant is employed.

Other addenda can be included such as, for example, charge control agents. Suitable charge control agents are disclosed for example in U.S. Pat. Nos. 3,893,935; 4,079,014; 4,323,634 and British Pat. Nos. 1,501,065 and 1,420,839. Charge control agents are generally employed in small quantities such as, from about 0.1 to about 3 weight percent and preferably from about 0.2 to about 1.5 weight percent based on the weight of the toner.

Powders suitable as carrier particles for use in the development of electrostatic images can also be prepared in accordance with this invention. In the preparation of carrier particles for example it may be desirable to include in the polymer that is ultimately to be dissolved or in the step of dissolution of the polymer in the solvent that is immiscible with water, magnetic materials such as those disclosed in U.S. Pat. No. 4,546,060 or U.S. Pat. No. 4,345,014.

The invention will further be illustrated by the following examples:

EXAMPLE 1

About 80 gms. of a branched polyester polymer prepared from about 87 grams of terephthalic acid, about 13 grams of dimethyl glutarate, about 95 grams of 1,2-propane diol and about 5 grams of glycerol and having a number average molecular weight of 10,000 and a weight average molecular weight of about 120,000 are dissolved together with about 5 gms. of Estofil Blue pigment in about 170 gms. of dichloromethane and about 86.7 gms. of toluene. This solution has a solid content of about 25% by weight, the pigment content being about 6% of the total solids content.

About 100 gms. of the above solution are added to a water suspension containing about 300 ml. of water, 10 ml. of silica the particles of which have a size of about 20-25 nanometers, this material being sold under the trademark Ludox TM by the du Pont company and about 3 ml. of a 10 percent solution of poly(adipic acid-co-methylaminoethanol). Prior to the addition of the polyester solution, the pH of the water phase was adjusted to approximately 4 by the addition of one normal hydrochloric acid. Upon addition of the polyester/solvent organic phase to the aqueous suspension, the system was immediately subjected to sheer using a Polytron sold by Brinkmann followed by a Microfluidizer. Upon exiting, the solvent is removed from the thus formed particles by stirring overnight at 40° C. in an open container. The particles formed have a particle size ranging from 2 to 5 $\mu$m and are nicely spherical beads coated with silica particles. These beads are washed with water and then with one normal sodium hydroxide containing a 1% solution of a fluorinated hydrocarbon surfactant sold under the trademark Zonyl FSN by the du Pont Company. The use of fluorinated hydrocarbon surfactants for separating silica particles from polymer prticles is the subject matter of copending U.S. application Ser. No. 171,066 entitled "Electrostatographic Toner and Method of Producing the Same" filed by Nair, and Pierce on even date herewith and assigned to the same assignee as this application. The following day the polyester polymer beads free of silica are recovered from the sodium hydroxide solution by filtration, washed with water and dried. The particles have a size distribution ranging from 2 to 5 micrometers and are useful as electrographic toner.

EXAMPLE 2

About 1000 gms. of the polyester of Example 1 and about 30 gms. of Rhodamine 3D propyl iodide are dissolved in about 400 gms. of dichloromethane. This provides a 20% solid solution of which 3% of the solids are pigment. The polyester and Rhodamine are dissolved in the dichloromethane by mixing and milling overnight. The solution is then added by passing through a Polytron followed by a Microfludizer to an aqueous solution containing about 15,090 ml of water, 377 ml of Ludox and 113 ml of a 10% solution of poly(adipic acid-co-methylaminoethanol). The dichloromethane is removed from the slurry by passing through a falling film evaporator approximately 4 to 5 times. The polymer particles formed are removed from the water by filtration and then washed with a one normal potassium hydroxide solution to which has been added 1% Zonyl FSN overnight. Following this overnight treatment particles are washed repeatedly with water and dried. The resulting particles are uniform and have an average particle size of 2 microns and are useful as electrostatic toner particles.

EXAMPLE 3

An organic phase is prepared by dissolving about 7 gms. of an 80% styrene-20% butylacrylate copolymer sold by Hercules under the tradename Piccotoner and about 7 gms. of magnetite particles are dispersed in about 80 gms. of dichloromethane by milling over night. This results in a dispersion containing 14% solids. This organic phase is added to an aqueous phase containing about 300 ml of water, about 2.5 ml of Ludox and about 0.75 ml of a 10% solution of poly(adipic acid-co-methylaminoethanol) which has been previously adjusted to a ph of 4 by the addition of one normal hydrochloric acid. The mixing is conducted in a Polytron homogenizer. The dichloromethane is removed from the organic phase by bubbling nitrogen through the aqueous dispersion overnight. The resulting prticles are then removed from the water phase by filtration and washed and dried. The resulting particles range in size from 3 to 10 microns and have a number average of 5.9 microns and a volume average of 7.7 microns. These particles are useful as single component magnetic toner particles.

EXAMPLE 4

The procedure of Example 3 is repeated with the exception that the organic phase is prepared as a 30% solids dispersion by utilizing about 15 gms. of the styrene butylacrylate polymer, about 15 gms. of the magnetite particles and about 70 gms. of dichloromethane. This organic phase, together with the aqueous phase, is then passed through a Polytron mixer in the same manner as in the previous example and the dichloloromethane is separated from the aqueous phase particles in a falling film evaporator. The particles are separated from the aqueous phase by filtration, washed and dried. The resulting magnetic toner of stryene butylacrylate containing magnatite particles has a particle size ranging from 1 to 10 micrometers with a number average of 4 micrometers and a volume average of 14 micrometers. These particles are useful as electrostatic toner or carrier particles.

EXAMPLE 5

Magnetic carrier beads for use in electrostatographic development are prepared by milling overnight about 10 gms. of chlorinated polyethylene containing about 65.8%chlorine and 10 gms. of magnatite in 250 gms. of methylene chloride and adding this dispersed organic phase to a water phase containing about 200 ml of water, about 5 ml of silicon dioxide particles and about 1.5 ml of a 10% solution of poly(adipic acid-co-methylaminoethanol). Rapid mixing together with high sheer are imposed by passing the mixture through a Polytron homogenzier. The methylene chloride is removed by bubbling nitrogen through the mixture overnight. The particles are filtered in order to separate them from the water phase and then washed with water several times and dried. The resulting magnetic carrier particles contain particles within the range of 4 to 15 micrometers have a average number average size of 7.5 microns and a volume average size of 11.3 microns.

EXAMPLE 6

5 to 6 micron magnetic beads suitable for use in magnetography are prepared by dispersing about 20 gms. Mapicoblack, about 20 gms. of an 80% styrene, 20% butylacrylate copolymer in about 160 gms. dichloromethane. The dispersion is milled overnight to insure that all of the copolymer has dissolved in the dichloromethane. 100 gms. of this dispersion is then passed through a Polytron homogenizer together with an aqueous phase made up of about 200 ml of water, 10 ml of silica, 3 ml of poly(adipic acid-co-methylaminoethanol) which has been previously adjusted to a pH of 4 by the addition of one normal hydrochloric acid. The dichloromethane is removed from the organic particles resulting therefrom the bubbling nitgrogen through the suspension overnight. The resulting particles are removed from the aqueous phase by filtration and washed with water and dried.

EXAMPLE 7

An electrostatographic toner is prepared by dissolving the following ingredients in about 215 gms. of dichloromethane and 20 gms. of toluene to obtain a 30% solids solution:
  125 gms. of the same polyester as used in Example 2,
  3 gms. of Rhodamine iodide
  about 0.5 gms. of tertiary butyl styrene-co-2(N,N,N,-trimethylammonium) ethylmethacrylate paratoluene sulfonate 80 gms. of the above prepared solution are mixed in a Polytron followed by a Microfluidizer with about 300 gms. of water, 5 ml of silica and 1.5 ml of a 10% solution of poly(adipic acid-co-methylaminoethanol) which has been previously adjusted to a ph of 4 by the addition of one normal hydrochloric acid. The solvent is evaporated from the resulting particles contained in the aqueous solution by stirring overnight in an open container under ambient conditions. Agglomerates, if any, are removed from the resulting particles by sieving through a 400 mesh screen. The silica is removed washing with one normal potassium hydroxide solution for 17 hours in the presence of a 1% solution of Zonyl FSN in water. The particles had an average particle size of 16 $\mu$m.

It is, of course, to be understood that throughout the examples, any suitable polymer solvent in comparable quantities can be used such as totuene, ethylacetate 111-trichloroethane and the like.

While the invention has been described in considerable detail with particular reference to certain preferred embodiments, it will be understood that variations such as different polymers mentioned above may be utilized throughout the examples for those used therein.

What is claimed is:

1. A method of making polymeric particles having a predetermined and controlled size and size distribution which comprises dissolving a polymer in a solvent therefor to form a solution said solvent being immiscible with water, forming a suspension of small droplets of said solution in water containing a promoter and silica particles having an average prticle size of from 0.001 $\mu$m to 1 $\mu$m by high shear agitation, said promoter being a water soluble compound that affects the hydrophilic/hydrophobic balance of the silica particles in the water suspension, removing the solvent from the droplets and separating the solidified polymer particles from the water.

2. The method of claim 1 wherein the silica is removed from the surface of the resulting particles.

3. A method of making electrostatographic toner or carrier particles having a predetermined and controlled size and size distribution which comprises dissolving a polymer in a solvent therefor to form a solution said solvent being immiscible with water, forming a suspension of small droplets of said solution in water containing a promoter and silica particles having an average particle size of from 0.001 μm to 1 μm by high shear agitation, said promoter being a water soluble compound that affects the hydrophilic/hydrophobic balance of the silica particles in the water suspension, removing the solvent from the droplets and separating the solidified polymer particles from the water.

4. The method of claim 3 wherein the silica is removed from the surface of the resulting particles.

5. The method of claim 3 wherein the silica particles have an average particle size of from about 5 to about 35 nanometers.

6. The method of claim 3 wherein the concentration of silica is from 0.5 to about 21 ml. per 100 grams of polymer and solvent.

7. The method of claim 5 wherein the silica particles have an average particle size of from about 10-25 nonometers.

8. The method of claim 6 wherein the concentration of silica is from 0.5 to 10 ml per 100 grams of polymer and solvent.

9. The method of claim 3 wherein the pH during the suspension forming step is maintained at from 2 to about 7.

10. The method of claim 9 wherein the pH during the suspension forming step is maintained at from 3 to 6.

11. The method of claim 3 wherein the promoter is poly(adipic acid-co-methylaminoethanol).

12. The method of claim 3 wherein the droplets of polymer and solvent contain coloring agents.

13. The method of claim 3 wherein the droplets of polymer and solvent contain magnetic particles.

14. The method of claim 3 wherein the droplets of polymer and solvent contain charge control agents.

* * * * *